(12) United States Patent
Oh

(10) Patent No.: US 9,068,677 B2
(45) Date of Patent: Jun. 30, 2015

(54) JOINT DEVICE FOR CORRUGATED PIPE

(71) Applicant: Kofulso Co., Ltd., Incheon-si (KR)

(72) Inventor: Seung-il Oh, Seoul (KR)

(73) Assignee: KOFULSO CO., LTD., Incheon-Si (KR)

( * ) Notice: Subject to any disclaimer, the term of this patent is extended or adjusted under 35 U.S.C. 154(b) by 121 days.

(21) Appl. No.: 13/940,867

(22) Filed: Jul. 12, 2013

(65) Prior Publication Data

US 2014/0265323 A1    Sep. 18, 2014

(30) Foreign Application Priority Data

Mar. 18, 2013    (KR) .................... 20-2013-0001975 U

(51) Int. Cl.
| | | |
|---|---|---|
| *F16L 33/213* | (2006.01) | |
| *F16L 25/00* | (2006.01) | |
| *F16L 13/14* | (2006.01) | |
| *F16L 27/08* | (2006.01) | |
| *F16L 33/01* | (2006.01) | |
| *B21D 39/04* | (2006.01) | |
| *B21D 39/20* | (2006.01) | |

(52) U.S. Cl.
CPC ........... *F16L 25/0036* (2013.01); *F16L 13/147* (2013.01); *F16L 27/0808* (2013.01); *F16L 33/01* (2013.01); *F16L 33/213* (2013.01); *B21D 39/046* (2013.01); *B21D 39/206* (2013.01)

(58) Field of Classification Search
CPC ..... F16L 27/0808; F16L 27/08; F16L 27/082; F16L 33/01; F16L 33/20; F16L 33/213; F16L 11/15; F16L 25/0036; F16L 19/0231; F16L 13/147; F16L 9/06
See application file for complete search history.

(56) References Cited

U.S. PATENT DOCUMENTS

| | | | | |
|---|---|---|---|---|
| 1,329,759 | A | * | 2/1920 | Fulton .............................. 285/95 |
| 1,329,760 | A | * | 2/1920 | Fulton ............................ 285/276 |
| 2,254,689 | A | * | 9/1941 | Livingston ....................... 33/447 |
| 2,381,498 | A | * | 8/1945 | Iverson ............................ 285/38 |
| 2,631,047 | A | * | 3/1953 | Spender et al. .......... 285/148.15 |
| 2,809,056 | A | * | 10/1957 | Kaiser ......................... 285/222.2 |
| 2,858,358 | A | | 10/1958 | Hawke |
| 2,898,940 | A | * | 8/1959 | Cole, Jr. ......................... 138/121 |
| 3,958,818 | A | | 5/1976 | Mason |
| 4,088,291 | A | * | 5/1978 | Delaplaine et al. ......... 248/186.1 |
| 4,152,821 | A | * | 5/1979 | Scott ............................. 29/421.1 |
| 4,481,697 | A | | 11/1984 | Bachle |
| 4,549,755 | A | | 10/1985 | Kot et al. |
| 4,692,561 | A | | 9/1987 | Nattel |
| 4,801,158 | A | | 1/1989 | Gomi |

(Continued)

FOREIGN PATENT DOCUMENTS

| | | | |
|---|---|---|---|
| CA | 2254689 A1 | * | 8/1999 |
| DE | 834929 | * | 7/1949 |

(Continued)

*Primary Examiner* — Daniel P Stodola
*Assistant Examiner* — James Linford
(74) *Attorney, Agent, or Firm* — Jacobson Holman, PLLC.

(57) ABSTRACT

A joint device for a corrugated pipe. A socket pipe in which a packing is forcedly inserted is joined to a non-corrugated part of the corrugated pipe and the non-corrugated part is expanded at the position of the packing. The joint device has a guide groove formed on the outer circumference of the socket pipe, a connector fit to the socket pipe, and a movable bolt screw-coupled to the outer face of the socket pipe and forcedly joined to the guide groove, so as to freely rotate the connector independently from the corrugated pipe.

2 Claims, 4 Drawing Sheets

(56) References Cited

U.S. PATENT DOCUMENTS

| | | | |
|---|---|---|---|
| 4,850,620 A * | 7/1989 | Puls | 285/148.13 |
| 5,072,072 A | 12/1991 | Bawa et al. | |
| 5,589,663 A | 12/1996 | Wales | |
| 5,866,853 A | 2/1999 | Sheehan | |
| 5,927,982 A | 7/1999 | Kruger | |
| 5,951,327 A | 9/1999 | Marik | |
| 6,036,237 A | 3/2000 | Sweeney | |
| 6,099,046 A | 8/2000 | Oh | |
| 6,173,995 B1 | 1/2001 | Mau | |
| 6,254,145 B1 | 7/2001 | Schwarz et al. | |
| 6,435,567 B2 | 8/2002 | Kikumori et al. | |
| 6,616,194 B1 | 9/2003 | Gretz | |
| 6,764,107 B1 | 7/2004 | Obahi et al. | |
| 6,767,032 B1 | 7/2004 | Gretz | |
| 6,908,114 B2 | 6/2005 | Moner | |
| 7,431,343 B2 | 10/2008 | Chiu | |
| 2004/0150224 A1* | 8/2004 | Lee | 285/317 |

FOREIGN PATENT DOCUMENTS

| | | | |
|---|---|---|---|
| EP | 000272511 A2 * | 12/1987 | |
| FR | 001121046 A * | 2/1955 | |
| FR | 001344115 A * | 11/1963 | |
| FR | 2826704 A1 * | 1/2003 | F16L 27/08 |
| GB | 191013778 A * | 0/1911 | |
| KR | 200142429 Y1 * | 11/1996 | |

* cited by examiner

JOINT DEVICE FOR CORRUGATED PIPE

BACKGROUND OF THE INVENTION

1. Field of the Invention

The present invention relates to a joint device for a corrugated pipe, and more particularly, to a joint device for a corrugated pipe to which a socket pipe and a connector are mounted to perfectly seal the corrugated pipe made of metal in such a manner that the connector can be rotated independently from the corrugated pipe, thereby easily replacing the connector as occasion demands.

2. Background Art

FIG. 1 is a view showing a joint device for a corrugated pipe according to a prior art.

As shown in FIG. 1, the corrugated pipe 10 includes a non-corrugated part 11 which is formed at one side and has no corrugation, and an expanded part 12 formed at an end of the non-corrugated part 11 and joined to a nut 20 not to be separated. The expanded part 12 is joined in such a way as to be in close contact with an inclined surface 31 formed at an end of a connector 30 and with an inclined surface 21 formed on an inner face of the nut 20.

However, such a joint device for the corrugated pipe according to the prior art has a problem in that it requires a skilled experience of a user when the user couples the connector 30 to the nut 20 because the joint device has a structure to keep airtightness between the corrugated pipe 10 and the connector 30 by coupling force between the nut 20 and the connector 30.

Moreover, the joint device for the corrugated pipe according to the prior art has another problem in that the connector 30 is joined by a restricted method to push the connector 30 into an object because the nut 20 and the connector 30 cannot be rotated on the corrugated pipe 10.

SUMMARY OF THE INVENTION

Accordingly, the present invention has been made to solve the above-mentioned problems occurring in the prior arts, and it is an object of the present invention to provide a joint device for a corrugated pipe, in which a socket pipe to which a packing is forcedly inserted is joined to a non-corrugated part of the corrugated pipe and the non-corrugated part is expanded at the position of the packing so as to keep airtightness in a pressed state of the packing.

It is another object of the present invention to provide a joint device for a corrugated pipe, which includes a guide groove formed on the outer circumference of the socket pipe, a connector inserted into the socket pipe, and a movable bolt screw-coupled to the outer face of the socket pipe and forcedly joined to the guide groove, so as to freely rotate the connector independently from the corrugated pipe.

To achieve the above objects, the present invention provides a joint device for a corrugated pipe including: a corrugated pipe having crests and valleys which are formed continuously and a metal woven layer surrounding an outer face of the corrugated pipe; a non-corrugated part formed at an end portion of the corrugated pipe; an inner ring forcedly fit to the non-corrugated part and located on an inner face of the metal woven layer; a fixing ring forcedly fit to the non-corrugated part and located on an outer face of the metal woven layer; a socket pipe having a coupling hole to which the fixing ring is forcedly inserted; a through hole formed inside the socket pipe and connected to the coupling hole, and an outer fitting groove and a guide groove formed on an outer face thereof; a connector having a spiral hole, which is perforated from the outer face of the connector 300 to an insertion hole located therein and corresponds to the guide groove, the insertion hole being connected to the through hole with the boundary of a jaw portion; a movable bolt forcedly fit to the guide groove through the spiral hole; an inner packing forcedly fit to the inner fitting groove; and an outer packing forcedly fit to the outer fitting groove, wherein the joint device further includes: an expanded part for expanding the inner packing outwardly in a state where the socket pipe is fit to the non-corrugated part; and a bent part getting in contact with a jaw portion of the fitting groove at an end portion of the non-corrugated part.

The joint device for the corrugated pipe according to the present invention can firmly fix the socket pipe by the expanded part, perfectly keep airtightness of the corrugated pipe by the inner packing and the outer packing pressed by the expanded part, and allow the connect to be freely rotated independently from the corrugated pipe, so as to allow easy joint work that the corrugated pipe is screw-coupled to an object and to allow easy maintenance work to replace the connector or the outer packing with a new one by releasing and separating the movable bolt from the guide groove to disassemble the connector.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
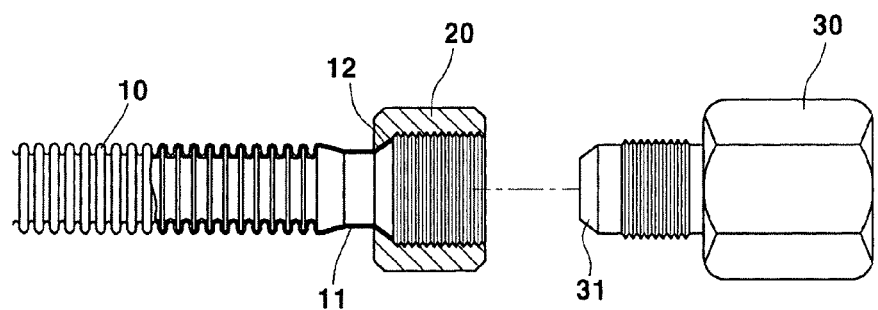
FIG. 1 is a view showing a connector for a corrugated pipe according to a prior art.
Figure 2:
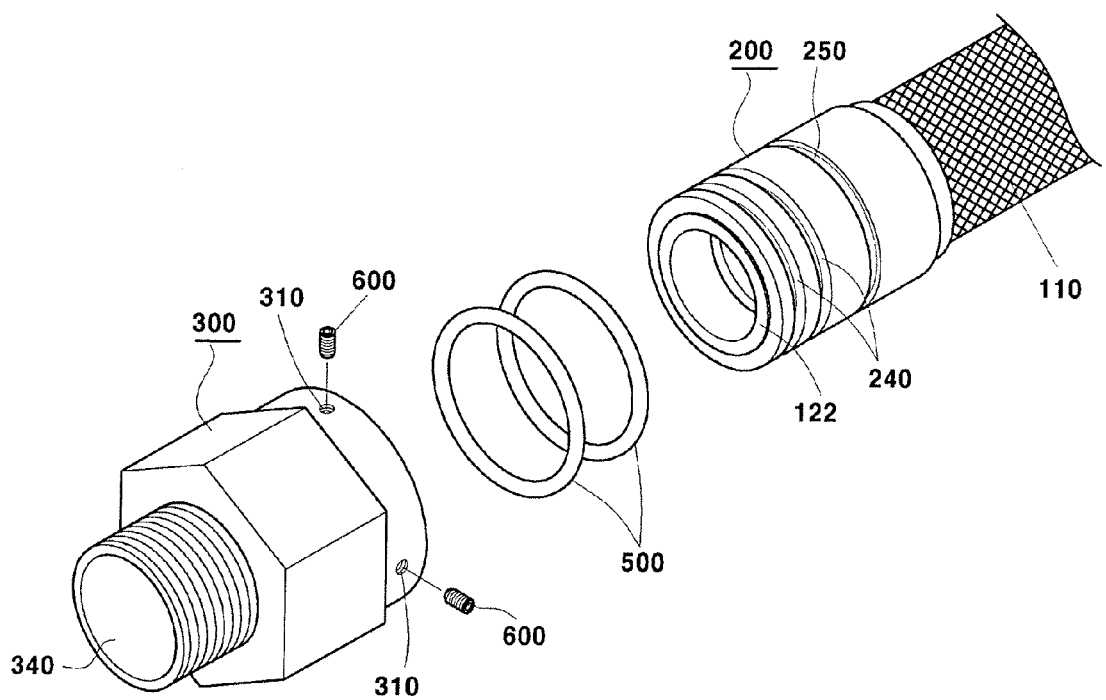
FIG. 2 is an exploded perspective view of a joint device for a corrugated pipe according to the present invention.
Figure 3:
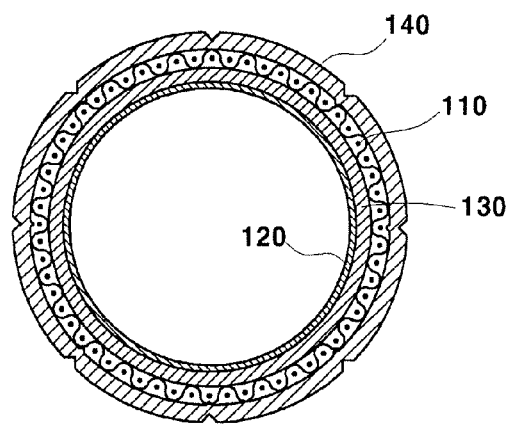
FIG. 3 is a sectional view showing an assembled state of the joint device for the corrugated pipe according to the present invention.

As shown in FIGS. 2 and 3, a joint device for a corrugated pipe according to the present invention includes a corrugated pipe 100 made of metal, a metal woven layer 110 surrounding the corrugated pipe 110, a socket pipe 200, and a connector 300.

The corrugated pipe 100 has crests and valleys which are formed continuously, and is easily bent so as to be easy in construction work.

The metal woven layer 110 serves to surround and protect the corrugated pipe 100.

Figure 4:
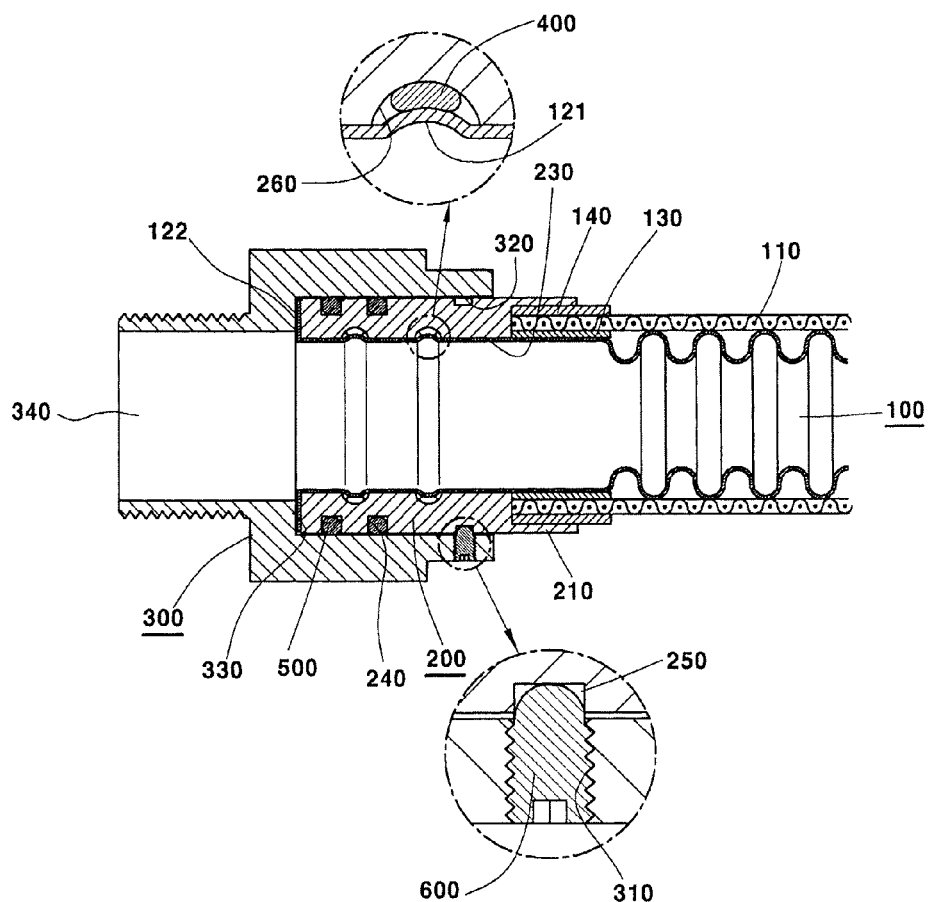
FIG. 4 is a sectional view showing a coupled state of an inner ring and a fixing ring of the present invention.

The corrugated pipe 100 includes a non-corrugated part 120 formed at an end portion thereof and having a predetermined diameter. An inner ring 130 is fit onto an inner face of an end portion of the metal woven layer 110 and a fixing ring 140 is fit onto an outer face of the end portion of the metal woven layer 110 surrounding one side of the corrugated pipe 100. In the above state, when the outer face of the fixing ring 140 is pressed at regular intervals, as shown in FIG. 4, the inner ring 130 and the fixing ring 140 are fixedly mounted on the non-corrugated part 120.

The socket pipe 200 includes: a coupling hole 210 formed on an inner face thereof for inserting the fixing ring 140 mounted on the non-corrugated part 120; a through hole 230 connected to the coupling hole 210; and an outer fitting groove 240 and a guide groove 250 formed on an outer face thereof. The through hole 230 has an inner fitting groove 260 to which an inner packing 400 is forcedly fit. An outer packing 500 is forcedly fit on the outer fitting groove 240.

The inner diameter of the inner packing 400 corresponds to the non-corrugated part 120, and the outer diameter of the outer packing 500 corresponds to an insertion hole 320 of the connector 300.

The connector 300 includes a spiral hole 310, which is perforated from the outer face of the connector 300 to the insertion hole 320 and is formed corresponding to the position of the guide groove 250. The socket pipe 200 is forcedly fit to insertion hole 320, and the spiral hole 310 in a state where the socket pipe 200 is joined to the insertion hole 320 corresponds to the guide groove 250. In the above state, a movable bolt 600 is forcedly fit to the guide groove 250 through the spiral hole 310, so that the connector 300 can be freely rotated. The insertion hole 320 is connected to the through hole 340 with the boundary of a jaw portion 330.

In the state where the socket pipe 200 is fit to the non-corrugated part 120 but the connector 300 is not connected, the expanded part 121 is formed by expanding out the non-corrugated part 120 at the position of the inner packing 400 so as to compress the inner packing 400 to the inner fitting groove 260, and a bent part 122 is formed at an end portion of the non-corrugated part 120 in such a way as to be contact with an end portion of the outer face of the socket pipe 200 and the jaw portion 330.

Figure 5:
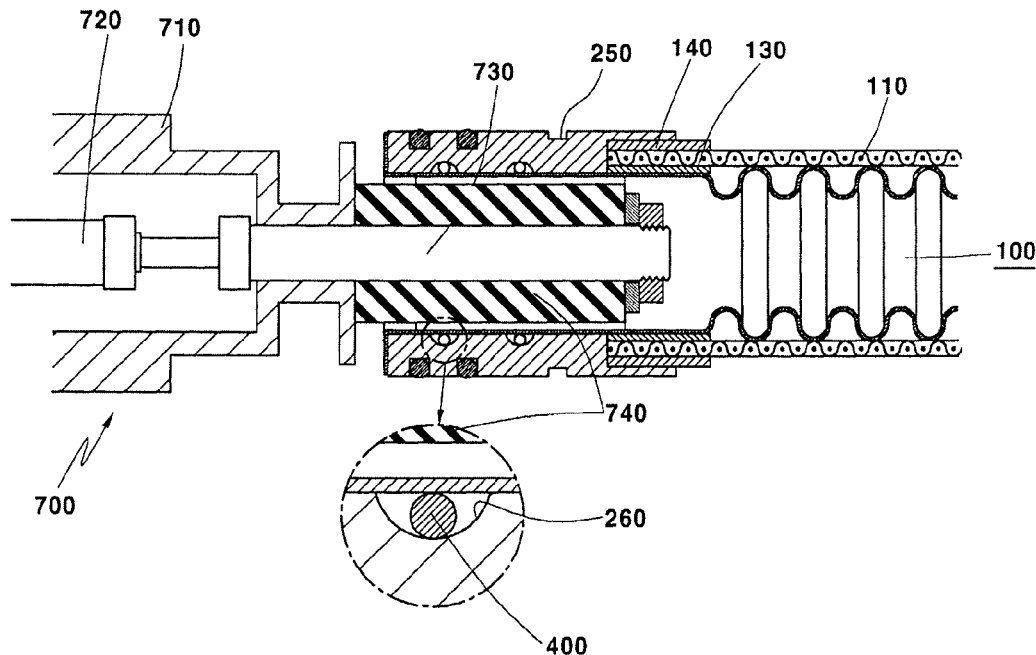
FIG. 5 is a view showing a state before an expanded part is formed.

FIG. 5 illustrates a state where expanding means 700 is put into the non-corrugated part 120 in order to form the expanded part 121.

The expanding means 700 includes: a main body 710 having a cylinder 720 mounted therein; a shaft part 730 protrudingly formed at one side of the main body 710; and an urethane rubber 740 located and compressibly mounted between the shaft part 730 and the main body 710.

Figure 6:
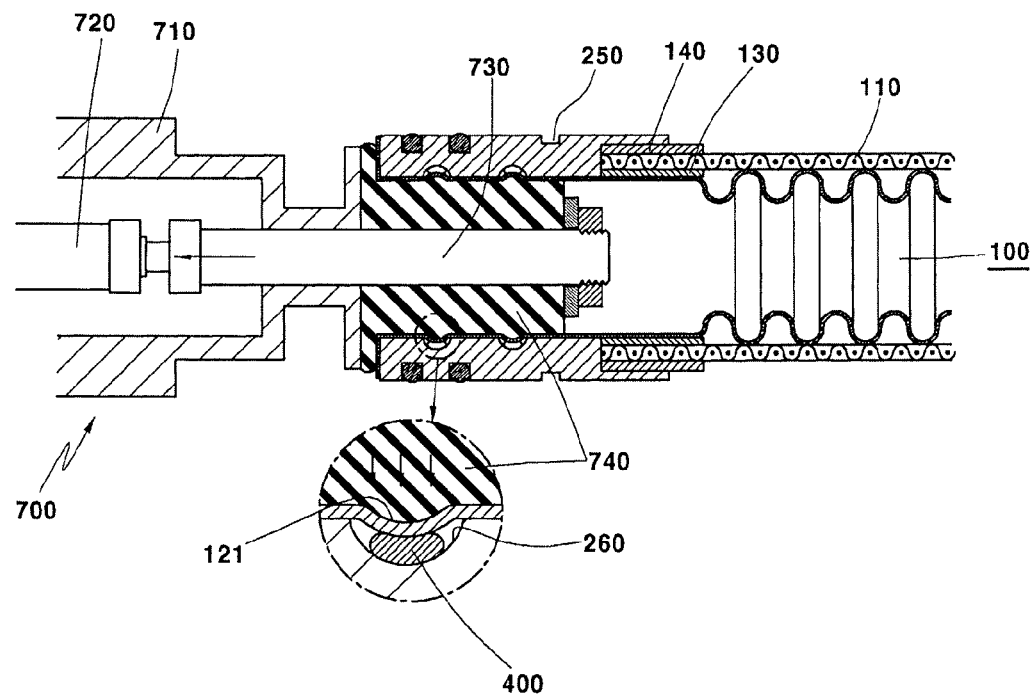
FIG. 6 is a view showing a state where the expanded part is formed.

When the cylinder 720 is operated so as to compress the urethane rubber 740 in a state where the urethane rubber 740 is inserted into the non-corrugated part 120, the non-corrugated part 120 gets in contact with the through hole 230, so that the urethane rubber 740 convexly expands the non-corrugated part 120 at the position of the inner packing 400 as shown in FIG. 6. In this instance, the inner packing 400 is compressed so as to be in contact with and the expanded part 121 and the inner fitting groove 260.

In the meantime, the non-corrugated part 120 protruding outwardly from the socket pipe 200 has the bent part 122 getting in contact with the end portion of the socket pipe 200 by the urethane rubber 740 convexly protruding out.

As described above, in the state where the expanded part 121 and the bent part 122 are formed on the non-corrugated part 120 so that the socket pipe 200 is integrated to the corrugated pipe 100, when the connector 300 is fit to the socket pipe 200 and an end of the movable bolt 600 is forcedly fit to the guide groove 250 through the spiral hole 310, an installation of the connector for the corrugated pipe according to the present invention is completed.

As described above, the joint device for the corrugated pipe according to the present invention can perfectly keep airtightness by the inner packing 400 and the outer packing 500 compressed to the inner fitting groove 260 by the expanded part 121, allow an easy joint work because the connector 300 joined to an object is independently rotated by the movable bolt 600 moving along the guide groove 250, and make maintenance easy because the outer packing 500 can be replaced with a new one just by releasing the movable bolt 600 to disassemble the connector 300.

Figure 7:
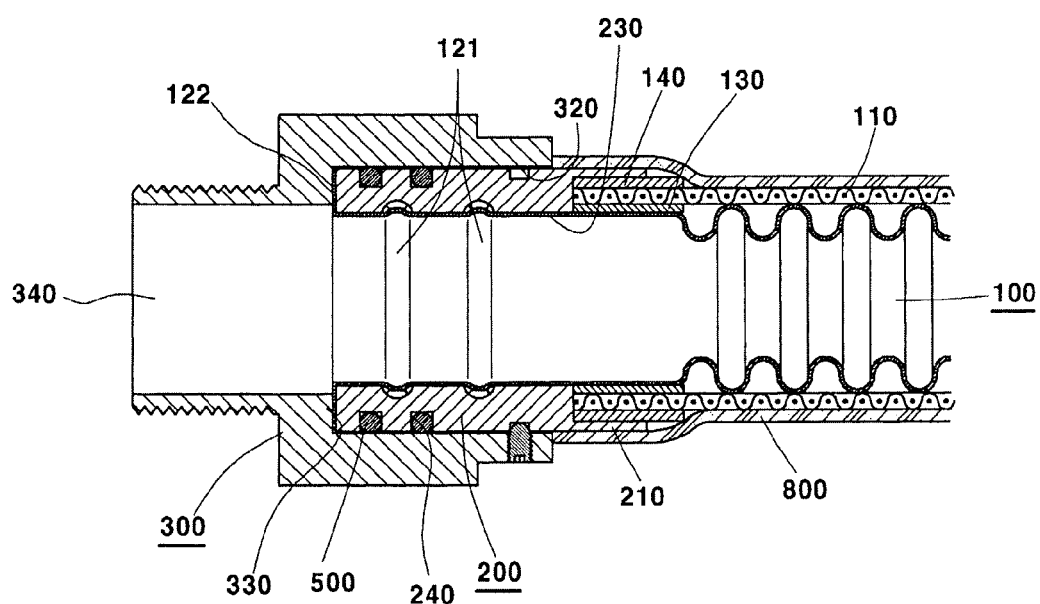
FIG. 7 is a sectional view of a joint device for a corrugated pipe according to another preferred embodiment of the present invention.

FIG. 7 illustrates a state where the joint device of the present invention is applied to a corrugated pipe 100 which has a woven layer 110 coated with resin.

While the present invention has been particularly described with reference to attached drawings, it will be understood by those of ordinary skill in the art that the present invention is not limited to the attached drawings and various changes may be made therein without departing from the technical idea of the present invention.

What is claimed is:

1. A joint device for a corrugated pipe comprising: a pipe having a corrugated section that transitions into a longitudinally extending non-corrugated section where the non-corrugated section ends with a bent portion, opposite the corrugated section, the bent portion extending radially outward, the corrugated section having crests and valleys which are formed continuously; a metal woven layer surrounding an outer face of the corrugated pipe; an inner ring fit to the non-corrugated part and located on an inner face of the metal woven layer; a fixing ring fit to the non-corrugated part and located on an outer face of the metal woven layer; a socket pipe having a coupling hole to which the fixing ring is forcedly fit; a through hole formed inside the socket pipe and connected to the coupling hole, and an outer fitting groove and a guide groove formed on an outer face thereof; a rotatable connector having a spiral hole, which is perforated from an outer face of the connector to an insertion hole located therein and corresponds to the guide groove, the insertion hole being connected to the through hole with the boundary of a jaw portion, where the jaw portion comprises a longitudinally extending portion and a radial extending portion; a movable bolt forcedly fit to the guide groove through the spiral hole; an inner packing forcedly fit to the inner fitting groove; an outer packing forcedly fit to the outer fitting groove; wherein the socket pipe surrounded by the rotatable connector, the longitudinally extending non-corrugated section extending through the socket pipe, the bent portion contacting the jaw portion and positioned between the radial extending portion and an end of the socket pipe that is surrounded by the rotatable connector; and the longitudinally extending non-corrugated section has an outward extended expanded part for expanding the inner packing outwardly in a recess formed on an internal surface of the socket pipe in a state where the socket pipe is fit to the longitudinally extending non-corrugated section.

2. The joint device according to claim 1, wherein the metal woven layer of the corrugated pipe is coated with resin.

* * * * *